(12) United States Patent
Wang et al.

(10) Patent No.: US 8,211,398 B2
(45) Date of Patent: Jul. 3, 2012

(54) METHOD FOR MAKING SEMICONDUCTING CARBON NANOTUBES

(75) Inventors: Xue-Shen Wang, Beijing (CN);
Qun-Qing Li, Beijing (CN); Shou-Shan Fan, Beijing (CN)

(73) Assignees: Tsinghua University, Beijing (CN);
Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/952,536

(22) Filed: Nov. 23, 2010

(65) Prior Publication Data
US 2011/0305625 A1 Dec. 15, 2011

(30) Foreign Application Priority Data

Jun. 15, 2010 (CN) .......................... 2010 1 0201344

(51) Int. Cl.
*B82Y 40/00* (2011.01)
*D01F 9/12* (2006.01)
(52) U.S. Cl. .............. 423/447.1; 423/447.3; 423/445 B; 977/742; 977/842
(58) Field of Classification Search ............... 423/447.1, 423/447.3; 977/742, 842, 843
See application file for complete search history.

(56) References Cited

PUBLICATIONS

Xueshen Wang, Qunqing Li, Gang Zheng, Yi Ren, Kaili Jiang and Shoushan Fan. "Selective fabrication of quasi-parallel single-walled carbon nanotubes on silicon substrates". 2010 Nanotechnology 21 39 5602. Sep. 1, 2010.*
Durrer et al. "SWNT Growth by LPCVD on Ferritin-Based Iron Catalyst Nanoparticles Towards CNT Sensors" Transducers & Eurosensors '07. The 14th International Conference on Solid-State Sensors, Actuators and Microsystems, Lyon, France, Jun. 10-14, 2007.*
Tran et al. "Secretion of Ferritin by Rat Hepatoma Cells and tis Regulation by Inflammatory Cytokines and Iron". Blood, vol. 90, No. 12. 4979-4986. Dec. 15, 1997.*

* cited by examiner

*Primary Examiner* — Daniel C McCracken
*Assistant Examiner* — Richard M Rump
(74) *Attorney, Agent, or Firm* — Altis Law Group, Inc.

(57) ABSTRACT

A method for making semiconducting carbon nanotubes is provided. A catalyst precursor is disposed on a substrate. The catalyst precursor includes blood. Organic substances contained in the blood are removed and iron ions contained in the blood are oxidized to yield discrete ferric oxide nano-particles on the substrate. The ferric oxide nano-particles are reduced to yield isolated iron nano-particles on the substrate. Carbon nanotubes then grow on the iron nano-particles.

19 Claims, 4 Drawing Sheets

METHOD FOR MAKING SEMICONDUCTING CARBON NANOTUBES

RELATED APPLICATIONS

This application claims all benefits accruing under 35 U.S.C. §119 from China Patent Application No. 201010201344.0, filed on Jun. 15, 2010 in the China Intellectual Property Office, the disclosure of which is incorporated herein by reference.

BACKGROUND

1. Technical Field

The present disclosure generally relates to methods for making semiconducting carbon nanotubes.

2. Description of Related Art

Single-walled carbon nanotubes (SWNTs) have attracted much attention because of their unique electrical properties and semiconducting SWNTs (s-SWNTs) have been recognized as promising building blocks for electronics applications. The electronic properties of SWNTs depend on chiral, and the ratio of the semiconducting to metallic SWNTs (m-SWNTs) is 2:1 according to the chiral distribution. Methods for separating m-SWNTs and s-SWNTs or converting m-SWNTs to s-SWNTs have been provided. However, those methods are complicated.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
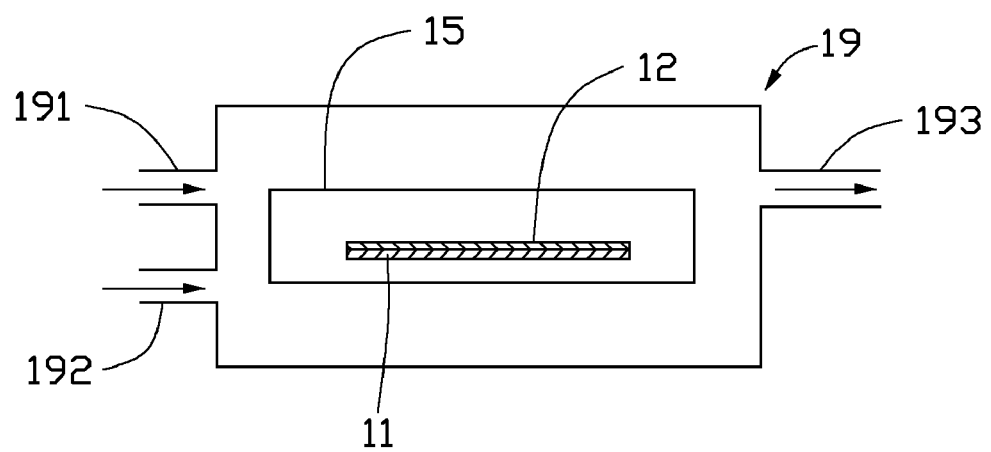
FIG. 1 is a schematic drawing that illustrates an apparatus used in a method for making semiconducting carbon nanotubes according to an embodiment.
Figure 2:
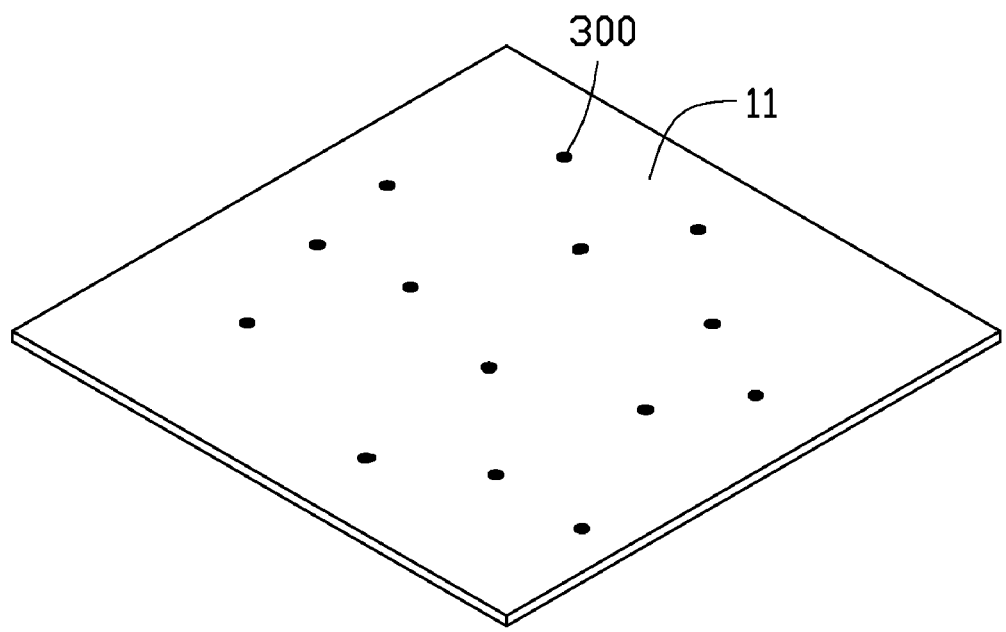
FIG. 2 is a schematic drawing that illustrates isolated iron nano-particles, which are fabricated from erythrocytes from the blood of Wistar rats, are disposed on a substrate.
Figure 3:
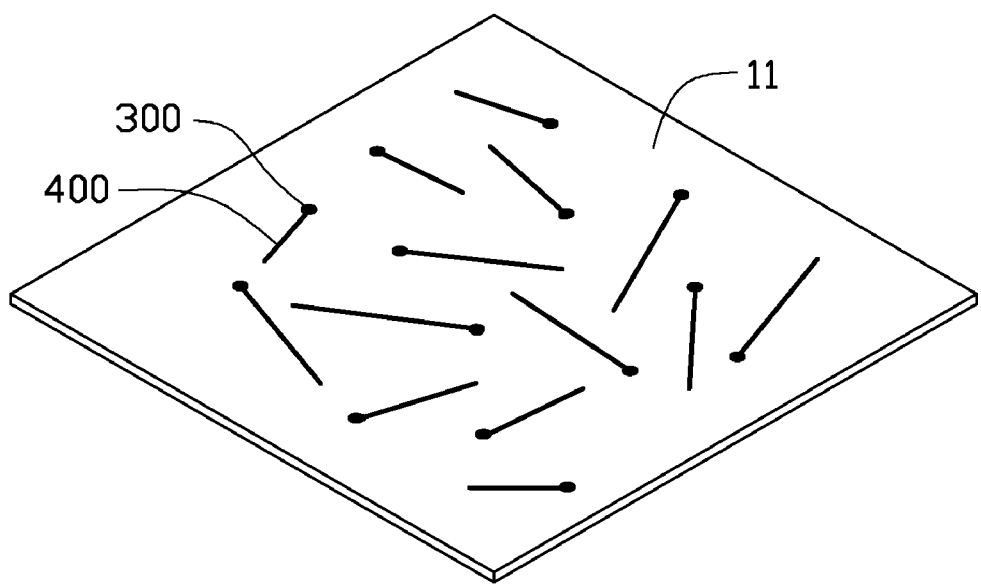
FIG. 3 is a schematic drawing that illustrates that a semi ducting carbon nanotube array is formed on the substrate.

A method for making semiconducting carbon nanotubes includes the steps of:
(a) disposing a layer of catalyst precursor 12 on a substrate 11, referring to FIG. 1, wherein the catalyst precursor 12 comprises blood, such as animal blood;
(b) removing organic substance contained in the blood and oxidizing iron ions contained in the blood to yield discrete ferric oxide ($Fe_2O_3$) nano-particles on the substrate 11;
(c) reducing the ferric oxide nano-particles to yield isolated iron (Fe) nano-particles 300 on the substrate 11, as shown in to FIG. 2;
(d) growing semiconducting carbon nanotubes 400 on the iron nano-particles 300, as shown in FIG. 3.

In step (a), the substrate 11 can be made of silica, silicon, or quartz. The blood can be taken from rats, pigs, cows, or other mammals. The majority of blood cells are erythrocytes, which contain haemoglobin, a type of iron-containing oxygen-transport metalloprotein. Haemoglobin has four ferrous ions ($Fe^{2+}$) because it is made up of one globin and four hemes that contain protoporphyrin and a ferrous ion. Thus, the blood cells provide a good supply of isolated ferrous ions.

The blood can be coated on the substrate 11 to form the catalyst precursor 12 by screen printing or spin coating. In one embodiment, the blood can be taken from Wistar rats and can be spin-coated on the substrate 11 at a spin speed of about 4000 to about 5000 revolutions per minute (rpm) for about 30 seconds to 2 minutes. In one embodiment, the blood is taken from Wistar rats and is spin-coated on the substrate 11 at a spin speed of about 5000 rpm for about 1 minute.

Step (b) includes the sub-steps of:
(b1) placing the substrate 11 with the catalyst precursor 12 thereon in a quartz tube 15;
(b2) heating the substrate 11 with the catalyst precursor 12 thereon to a first temperature for a first period of time, to remove the organic materials contained in the catalyst precursor 12; contemporaneously, ferrous ions contained in the blood of the catalyst precursor 12 are oxidized to form ferric oxide nano-particles on the substrate 11.

In sub-step (b1), the substrate 11 with the catalyst precursor 12 can be horizontally placed in the center of the quartz tube 15.

In sub-step (b1), the quartz tube 15 can be horizontally placed in a furnace 19. The furnace 19 is a tube structure having two opposite end surfaces, namely first end surface and second end surface. The furnace 19 comprises a first gas inlet port 191, a second gas inlet port 192, and a gas outlet 193. The first gas inlet port 191 and the second gas inlet port 192 are in the first end surface. The gas outlet 193 is in the second end surface. The furnace 19 further includes a heating element (not shown) configured for heating the quartz tube 15 placed in the furnace 19.

In one embodiment, the substrate 11 with the catalyst precursor 12 thereon can be heated in the presence of air at the first temperature, about 400 to 700 centigrades, and can be kept at the first temperature for about 5 to 30 minutes.

Step (c) includes following sub-steps of:
(c1) removing air contained in the furnace 19 by charging the furnace 19 with protective gas from the first gas inlet port 191; the protective gas can be inert gases, such as argon;
(c2) heating the substrate 11 with the catalyst precursor 12 thereon to a second temperature for a second period of time, and introducing reducing gas into the furnace 19 through the second gas inlet port 192.

In step (c2), the substrate 11 with the catalyst precursor 12 thereon can be heated to the second temperature of about 800 to about 900 centigrade, for the second period of time, about 10 to about 30 minutes. The reducing gas can be hydrogen, which can be introduced into the furnace 19 at a flow rate of 600 sccm for 10 min to reduce the ferric oxide nano-particles to yield isolated iron nano-particles 300 on the substrate 11. As described above, the blood cells can provide a good supply of isolated ferrous ions, thus, a lot of isolated iron nano-particles 300 can be directly formed on the substrate 11, as shown in FIG. 2. In one embodiment, the sizes of the iron nano-particles 300 can be below 3 nm, about 2.5 nm. Because the diameter of the nanotubes is smaller than the size of the catalyst nano-particle, thus, using haemoglobin to make isolated iron nano-particles as catalyst, SWNTs with a narrow-diameter distribution can be synthesized in step (4).

Step (d) includes introducing a mixture of a carbon source gas and a carrier gas into the furnace 19 through the second gas inlet port 192, and heating the furnace 19 to a reaction temperature to grow carbon nanotubes on the iron nano-particles 300. The reaction temperature can be about 800 to about 1100 centigrades. The carrier gas is used to carry the carbon source gas into the furnace 19. The carrier gas can be a noble gas, nitrogen, or hydrogen. The carrier gas can also be used to adjust the pressure of the furnace 19. The carbon source gas can be a hydrocarbon such as methane, acetylene, or ethane. The ratio of the carbon source gas and the protective gas can be about 1:1 to about 5:1.

In one embodiment, the carrier gas can be introduced at a flow rate of 100 sccm for about 10 minutes. The carbon source gas can be introduced at a flow rate of 50 sccm for about 20 minutes. The reaction temperature can be about 900 to about 970 centigrades. A plurality of single-walled carbon nanotubes 400 can synthesize from the isolated iron nano-particles 300, as shown in FIG. 3. The diameter of the single-walled carbon nanotubes 400 can be about 1.2 nm.

Figure 4:
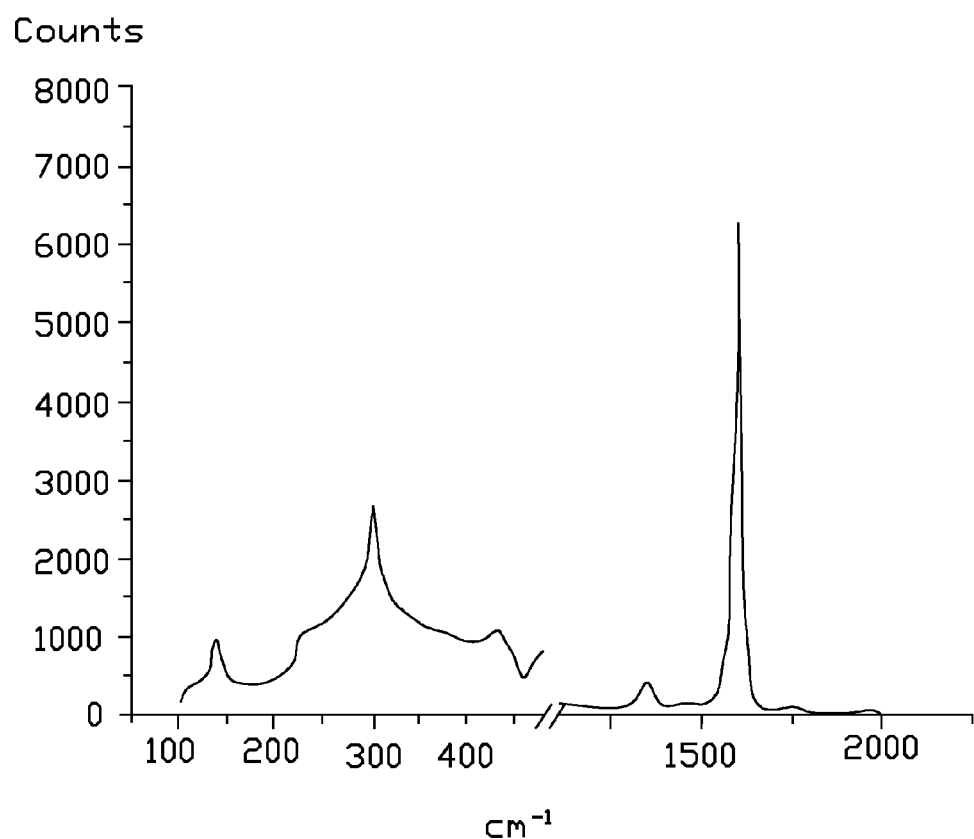
FIG. 4 shows a Raman spectra of the semi ducting carbon nanotube array.

A representative Raman spectrum of the single-walled carbon nanotubes 400 fabricated according to the method of one embodiment is shown in FIG. 4, which shows the radial breathing mode frequency at 137 $cm^{-1}$, which indicates that the single-walled carbon nanotubes 400 are semiconducting according to the Kataura plot. In some embodiments, about 80 to about 97 percent of the single-walled carbon nanotubes 400 fabricated according to the method of one embodiment are semiconducting.

In another embodiment, in step (a), the catalyst precursor 12 can be a mixture of the blood and a solvent. The solvent can be one of physiological saline, distilled water, deionized water. The solvent and the blood, which can be taken from Wistar rats, can be mixed together in a volume ratio of about 1:0.1 to about 1:10. In one embodiment, the volume ratio of the solvent and the blood of Wistar rats are 1:1. The diluted blood then can be coated on the substrate 11 in a manner descried in above. The diluted blood can help to produce more semiconducting single-walled carbon nanotubes 400.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What claimed is:

1. A method for making semiconducting carbon nanoubes, the method comprising the steps of:
   disposing a catalyst precursor on a substrate, wherein the catalyst precursor comprises blood and a solvent, wherein the solvent and the blood are mixed together in a volume ratio of about 1:0.1 to about 1:10;
   removing organic substances contained in the blood and oxidizing iron ions contained in the blood to yield discrete ferric oxide nano-particles on the substrate;
   reducing the ferric oxide nano-particles to yield isolated iron nano-particles on the substrate; and
   growing carbon nanotubes on the iron nano-particles.

2. The method of claim 1, wherein the blood is mammalian blood.

3. The method of claim 1, wherein the step of disposing the catalyst precursor on the substrate comprises coating the substrate with the blood.

4. The method of claim 1, wherein the solvent is selected from the group consisting of physiological saline, distilled water, and deionized water.

5. The method of claim 1, wherein the solvent and the blood are mixed together in a volume ratio of about 1:1.

6. The method of claim 1, wherein the substrate comprises silica, silicon, or quartz.

7. The method of claim 6, wherein the step of disposing the catalyst precursor on the substrate comprises screen printing or spin coating the blood on the substrate to form the catalyst precursor.

8. The method of claim 7, wherein the spin-coating comprises spinning the substrate at a spin speed of about 4000 to about 5000 revolutions per minute for about 30 seconds to 2 minutes.

9. The method of claim 1, wherein the step of removing organic substances contained in the blood and oxidizing iron ions contained in the blood comprises heating the substrate with the catalyst precursor thereon to a first temperature for a first period.

10. The method of claim 9, wherein the step of removing organic substances contained in the blood and oxidizing iron ions contained in the blood further comprises heating the substrate with the catalyst precursor thereon in the presence of air to the first temperature, and keeping the substrate with the catalyst precursor thereon at the first temperature for about 5 minutes to about 30 minutes; wherein the first temperature is in the range of about 400 centigrade to about 700 centigrade.

11. The method of claim 1, wherein the step of reducing the ferric oxide nano-particles comprises disposing the substrate with the ferric oxide nano-particles thereon in a furnace and removing air contained in the furnace by charging the furnace with protective gas.

12. The method of claim 11, wherein the step of reducing the ferric oxide nano-particles further comprises heating the substrate with the catalyst precursor thereon to a second temperature for a second period; and introducing reducing gas into the furnace.

13. The method of claim 12, wherein the step of reducing the ferric oxide nano-particles further comprises heating the substrate with the catalyst precursor thereon to the second temperature for about the second period for about 10 minutes to about 30 minutes; wherein the second temperature ranges from about 800 centigrade to about 900 centigrade.

14. The method of claim 11, wherein the step of growing carbon nanotubes on the iron nano-particles comprises introducing a mixture of a carbon source gas and a carrier gas into the furnace and heating the furnace to a reaction temperature to grow the carbon nanotubes on the iron nano-particles.

15. The method of claim 14, wherein the step of growing carbon nanotubes on the iron nano-particles, comprises introducing the carrier gas into the furnace at a flow rate of 100 sccm for about 10 minutes; and introducing the carbon source gas into the furnace at a flow rate of 50 sccm for about 20 minutes.

16. A method for making semiconducting carbon nanoubes, the method comprising the steps of:
    disposing a catalyst precursor on a substrate by spin coating, wherein the catalyst precursor comprises blood, the spin-coating comprises spinning the substrate at a spin speed of about 4000 to about 5000 revolutions per minute for about 30 seconds to 2 minutes;
    removing organic substances contained in the blood and oxidizing iron ions contained in the blood to yield discrete ferric oxide nano-particles on the substrate;
    reducing the ferric oxide nano-particles to yield isolated iron nano-particles on the substrate; and
    growing carbon nanotubes on the iron nano-particles.

17. The method of claim 16, wherein the blood is mammalian blood.

18. The method of claim 17, wherein the catalyst precursor is a mixture of the blood and a solvent.

19. The method of claim 18, wherein the solvent and the blood are mixed together in a volume ratio of about 1:1.

* * * * *